(12) United States Patent
Johnson et al.

(10) Patent No.: US 7,585,214 B1
(45) Date of Patent: Sep. 8, 2009

(54) AUTOMATEDLY FOLDABLE AND UNFOLDABLE GRAIN TANK EXTENSION AND COVER FOR AN AGRICULTURAL HARVESTING MACHINE

(75) Inventors: Orlin W. Johnson, Geneseo, IL (US); William L. Cooksey, Geneseo, IL (US); Jason R. Coppinger, Davenport, IA (US); Tulugu Venugopala Rao, Davenport, IA (US); Steven M. Wardlow, Milan, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/072,412

(22) Filed: Feb. 26, 2008

(51) Int. Cl.
*A01F 12/60* (2006.01)
(52) U.S. Cl. .................................. 460/119
(58) Field of Classification Search ............... 460/119, 460/23, 8, 150; 414/505, 293, 301, 295, 414/502; 296/15, 173, 175, 26.04, 26.09, 296/99.1
See application file for complete search history.

(56) References Cited

U.S. PATENT DOCUMENTS

| | | | | |
|---|---|---|---|---|
| 4,029,228 A | * | 6/1977 | Shaver | 414/505 |
| 4,106,649 A | * | 8/1978 | Nelson et al. | 414/505 |
| 4,466,549 A | * | 8/1984 | Hanaway | 220/4.03 |
| 5,151,064 A | | 9/1992 | Damman et al. | 460/23 |
| 5,427,572 A | | 6/1995 | Deutsch et al. | 460/119 |
| 6,074,298 A | | 6/2000 | Majkrzak et al. | 460/119 |
| 6,126,220 A | | 10/2000 | Brasher | 296/26.04 |
| 6,206,779 B1 | * | 3/2001 | Gerber et al. | 460/23 |
| 6,508,705 B1 | | 1/2003 | Van Overschelde | 460/23 |
| 6,679,772 B2 | | 1/2004 | Johnson et al. | 460/23 |
| 6,692,352 B2 | | 2/2004 | Gerber et al. | 460/119 |
| 6,752,715 B2 | * | 6/2004 | Stephens et al. | 460/23 |
| 7,018,290 B2 | | 3/2006 | Ramon et al. | 460/119 |
| 7,101,280 B2 | * | 9/2006 | Colpaert | 460/119 |
| 2003/0232634 A1 | * | 12/2003 | Johnson et al. | 460/119 |
| 2004/0033823 A1 | * | 2/2004 | Stephens et al. | 460/119 |
| 2006/0240884 A1 | | 10/2006 | Klimmer | |
| 2007/0054714 A1 | | 3/2007 | Lukac et al. | |

\* cited by examiner

*Primary Examiner*—Árpád Fábián-Kovács
(74) *Attorney, Agent, or Firm*—Michael G. Harms; John William Stader; Patrick M. Sheldrake

(57) ABSTRACT

An automatedly foldable and unfoldable grain tank extension construction for increasing the grain holding capacity of a grain tank of an agricultural harvesting machine, such extension construction including a plurality of extension panels mounted for pivotal movement about corresponding, respective, upper peripheral portions of the grain tank, with pliable corner pieces extending between adjacent extension panels to seal the corner spaces between the adjacent extension panels, especially when the extension construction is deployed or unfolded, wherein the pivotal movements of the extension panels are controllable by operation of a linkage system that automatedly effects the folding and unfolding of the extension construction by effecting movement of each extension panel through an angle greater than 90°, with at least the control actuator of the linkage system being located external to the grain tank so as to be generally accessible for servicing even when the grain tank is filled.

20 Claims, 12 Drawing Sheets

AUTOMATEDLY FOLDABLE AND UNFOLDABLE GRAIN TANK EXTENSION AND COVER FOR AN AGRICULTURAL HARVESTING MACHINE

TECHNICAL FIELD

This invention relates generally to an extension for a grain tank of an agricultural harvesting machine such as a combine, and control linkages therefor which are generally accessible for servicing even when the grain tank is filled, and more particularly, to a grain tank extension construction that is configured to be automatedly and/or remotely unfoldable and foldable in a predetermined manner between a folded or closed position and a deployed or unfolded position and which includes extension panels that are sized and dimensioned to be disposed at least generally horizontal when in the folded position, with the right and left hand extension panels covering essentially the entirety of the upwardly facing opening of the grain tank, and to extend upwardly and outwardly relative to an upwardly facing opening of the grain tank when in the unfolded position, thereby protecting the grain tank from introduction of rain and foreign materials when the grain tank extension construction is folded while also providing for increased grain holding capacity when the grain tank construction is unfolded.

BACKGROUND ART

In the past, when it was desired to increase the capacity of the grain tank of an agricultural harvesting machine such as a combine, a rigid walled structure was sometimes, if not typically, affixed around an upwardly facing opening of the grain tank so as to extend upwardly therefrom. Such known extensions generally provided satisfactory grain capacity increasing utility, but suffered from various shortcomings. Due to the increase in overall height of the combines when such structures were installed, the height of the combine often exceeded government imposed height limitations for road travel, as a consequence of which removal and reinstallation of such structures was often necessary, with attendant expenditures of time and efforts. Additionally, such rigid structures themselves provided no covering protection for the grain tank and its contents.

It was also known to provide an extendible cover for the upwardly facing opening of a grain tank, which cover was automatically movable directly upwardly from the periphery of the opening along at least two sides of the grain tank so as to expand the grain holding capacity. However, since at least two sides of such known devices extended only directly upwardly, and not outwardly, from the upward opening, the increased grain holding capacity was more limited than was desirable.

More recently, a foldable grain tank extension for combines was developed, as disclosed in U.S. Pat. No. 6,679,772. Such construction was a significant advance, but did not fully address the protection of the grain tank from introduction of rain and foreign materials when the grain tank extension construction is folded or difficulties experienced with the use and serviceability of linear actuators or other linkages mounted interior to the grain tank to control the unfolding of the grain tank extension panel construction. There has thus remained a desire for a foldable grain tank extension that can not only secure the advantages provided by the construction of U.S. Pat. No. 6,679,772 but which would also enable the grain tank to be protected from the introduction of rain and foreign materials when the construction is folded and would permit servicing of at least major portions of the linkages and their systems even while the grain tank is full.

SUMMARY OF THE INVENTION

What is now disclosed is a foldable and unfoldable grain tank extension construction for increasing the grain holding capacity of a grain tank of an agricultural harvesting machine wherein the grain tank includes angularly related upper peripheral portions defining an upwardly facing opening. Such extension construction includes a plurality of extension panels mounted for pivotal movement about corresponding, respective, upper peripheral portions of the grain tank, which pivotal movements are controllable by operation of a linkage system that automatedly effects the folding and unfolding of the extension construction. Such linkage system is configured and installed to be capable of moving each extension panel through an angle greater than 90° and such that principal components thereof are located external to the grain tank so as to be generally accessible for servicing even when the grain tank is filled. Pliable corner pieces extend between adjacent extension panels to seal the corner spaces between the adjacent extension panels, especially when the extension construction is deployed or unfolded.

The extension panels of such extension construction are so foldable and unfoldable, individually and as a group, by operation of the linkage system, as to be movable between a deployed or unfolded position, with the extension panels extending upwardly and outwardly relative to the opening of the grain tank, and a folded position, with the folded arrangement of extension panels extending over the upwardly facing opening of the grain tank to provide a top cover over such opening. In such regard, the extension panels are so sized, dimensioned, and configured that they may be appropriately arranged, when the extension construction is folded, to form a suitable cover over the upwardly facing opening of the grain tank.

In some variants the corner pieces may be formed or conditioned to include hinged portions operable to fold and unfold in predetermined manners and in other variants such corner pieces may be formed or conditioned to be flexible or somewhat elastic and to expand and contract or to be compressed in certain ways. In some embodiments of the invention, the corner pieces may each be configured and foldable so as to be located between the extension panels when in the folded or closed position. In other embodiments, the corner panels may be configured and foldable to overlay the ends of the extension panels when in the folded or closed position.

The linkage system is preferably operable such that actuation of a control actuator or component can effect folding or unfolding of the various extension panels in an ordered manner to position the extension construction in either its unfolded or deployed position or its folded or stored position. Preferably, actuation of the control component will also effect a repositioning of the bubbler auger apparatus within the grain tank, with the bubbler auger apparatus being repositioned to an elevated condition when the extension construction is in its unfolded or deployed position and being returned to a nominal position when the extension construction is in its folded or stored position.

DETAILED DESCRIPTION OF THE INVENTION

Figure 1:
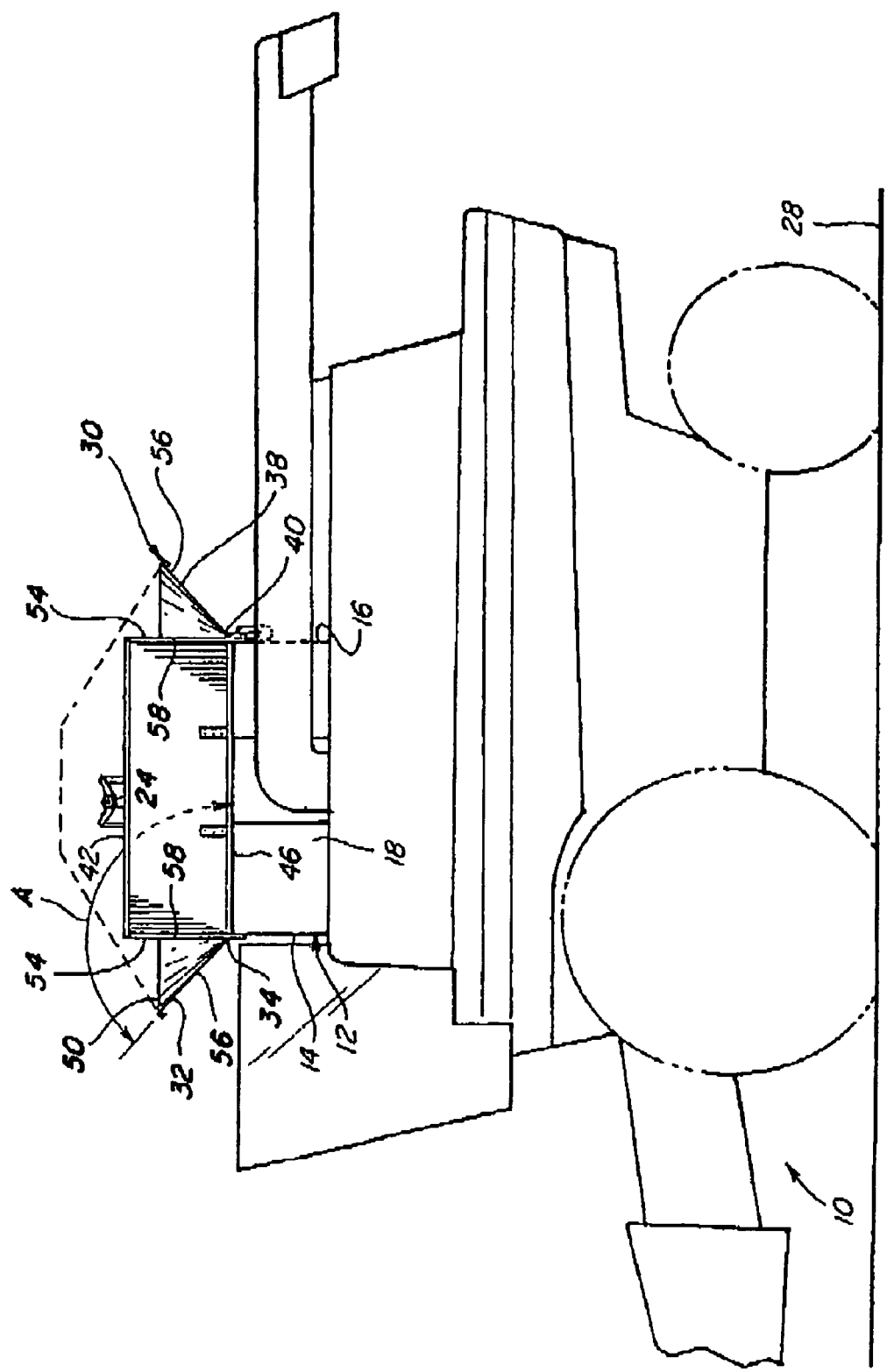
FIG. 1 is a simplified side view of a representative harvesting machine including a grain tank having a foldable extension according to the present invention, with such extension shown in a deployed or unfolded position supporting a quantity of grain, which grain quantity is represented by the dotted lines at the top of the grain tank.
Figure 2:
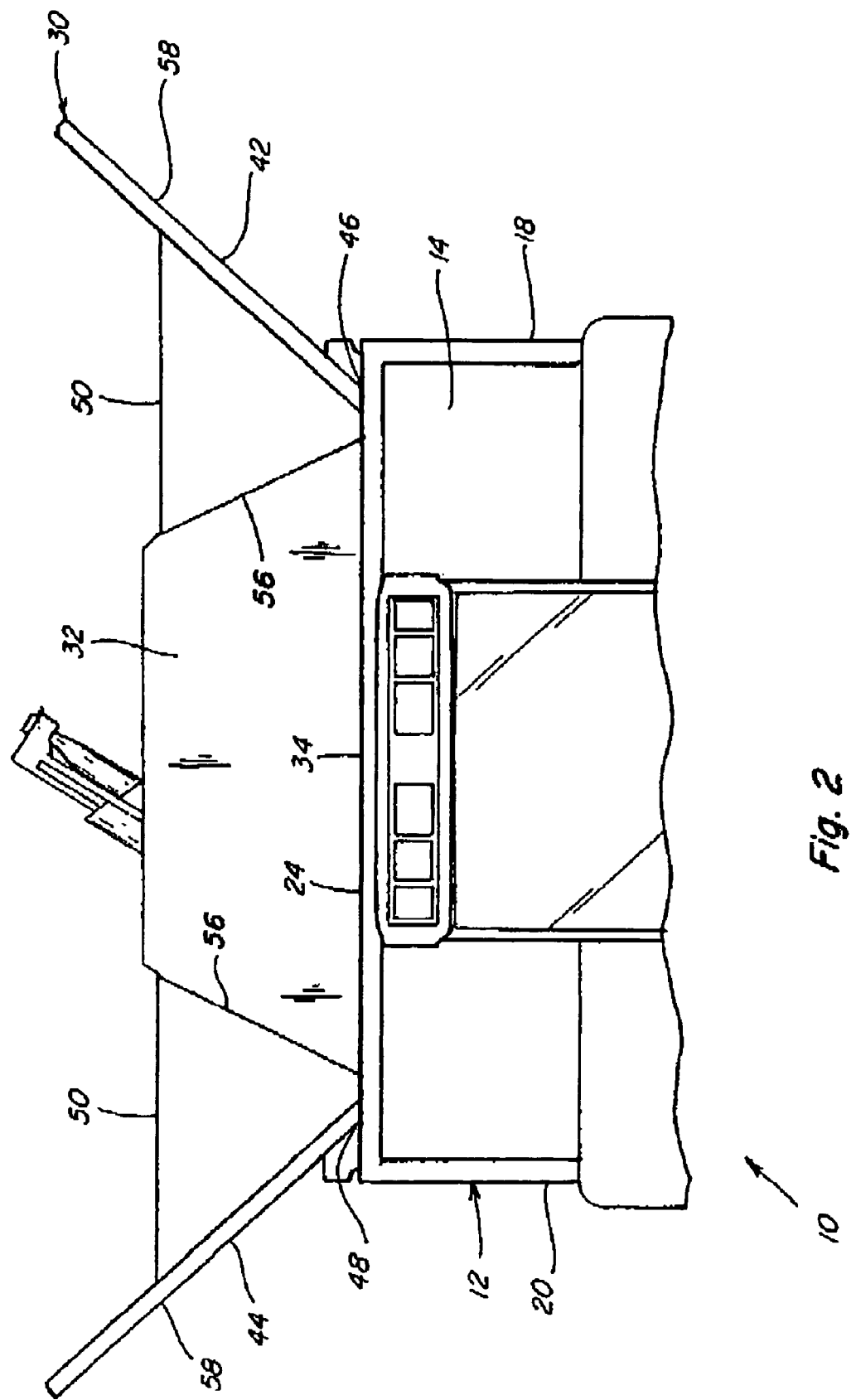
FIG. 2 is a simplified fragmentary front view of the harvesting machine of FIG. 1 showing the foldable extension in the deployed position.
Figure 3:
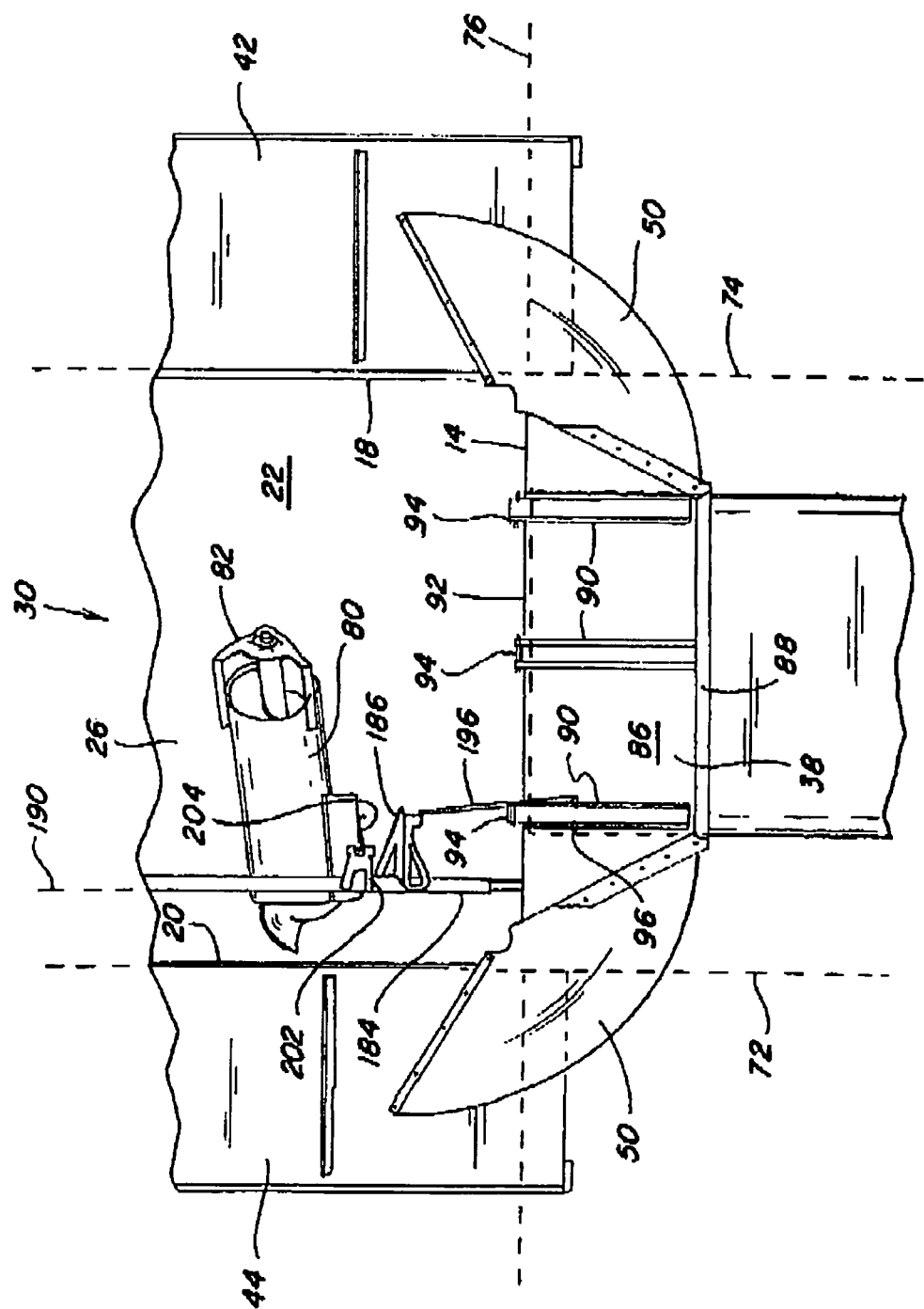
FIG. 3 is a simplified fragmentary top view of the harvesting machine and foldable extension of FIG. 1, also showing the bubbler auger in the grain tank, with the front of the machine at the bottom of such figure.

Referring now to the drawings, wherein like numbers refer to like items, FIGS. 1 and 2 depict a representative self-propelled combine harvesting machine 10, including apparatus for harvesting, cleaning and conveying clean grain, such as, but not limited to, corn, wheat, or soybeans, to a grain tank 12 located atop machine 10. Grain tank 12 includes a plurality of upstanding, angularly related walls, including a forward wall 14, a rear wall 16 opposite forward wall 14, and opposed side walls 18 and 20 (FIG. 2) extending between forward and rear walls 14 and 16. Referring also to FIG. 3, walls 14, 16, 18, and 20 define a rectangular shaped receptacle 22, the side-to-side dimensions of which are typically greater than the front to back dimensions, for receiving and holding grain harvested by machine 10. Walls 14, 16, 18, and 20 additionally include a substantially continuous, rectangular upper edge 24 (FIGS. 1 and 2) defining an upper end of receptacle 22 and an upwardly facing rectangular opening 26 (FIG. 3) corresponding at least generally in horizontal extent to receptacle 22.

Upper edge 24 typically represents the highest or one of the highest points on a combine such as harvesting machine 10 relative to a surface 28 (FIG. 1) such as the ground or a road surface on which machine 10 is located. This height is typically limited to a maximum value as dictated by a governmental entity for safe passage on public roads, under bridges and/or utility wires. However, such a maximum height poses a difficulty insofar as it thus limits the height and, thus, the grain holding capacity of grain tank 12.

As a result, a problem that can arise, particularly when harvesting operations are being carried out in very large fields, is that, in the absence of an extension, grain tank 12 may fill to its capacity before a section of a crop field being harvested has been completed, or when machine 10 is at a location within a field far from a grain truck or wagon into which the grain is to be unloaded, such that the harvesting operations must be undesirably interrupted, for a longer than desired time, for the unloading of the grain tank, which actions may require significant time expenditures to drive machine 10 to the unloading location, to unload it, and to then return it to the harvesting location. However, if a rigid, fixed extension is placed about upper edge 24 to expand the capacity of a grain tank 12 in the known manner, thereby minimizing to some extent the down time that would otherwise be associated with more frequent interruptions for unloading of the grain tank, if such extension causes the overall height of the machine 10 with the mounted, fixed extension to exceed the maximum lawful height, the extension must be removed for legal passage of the machine 10 over public roads, which removal operation can be time consuming. Even if the machine 10 is not operated on public roads, such extension, because of the increase in height that results from the use thereof, may extend to such an extent that it undesirably contacts low hanging tree limbs and is damaged by such contact or causes damage to such limbs themselves.

To avoid the above-discussed problems, grain tank 12 of harvesting machine 10 includes a foldable extension 30 constructed and operable according to the teachings of the present invention. Extension 30 is foldable between a deployed or unfolded position (FIGS. 1, 2, and 3) extending upwardly and outwardly from grain tank 12 for substantially increasing the grain holding capacity thereof, and a folded or closed or stored position (FIGS. 4 and 5) so as to be more easily capable of meeting overall height limitations of machine 10 for travel over public roads and the like. As will be further discussed hereinafter, when the extension 30 is folded to its folded position, various of the extension components are disposed with certain of the components in a stacked arrangement to form an at least generally horizontal cap that overlays opening 26 to essentially cover opening 26 in order to thereby protect the grain tank 12 from the introduction of rain and foreign materials while the extension 30 remains in such folded position.

Figure 4:
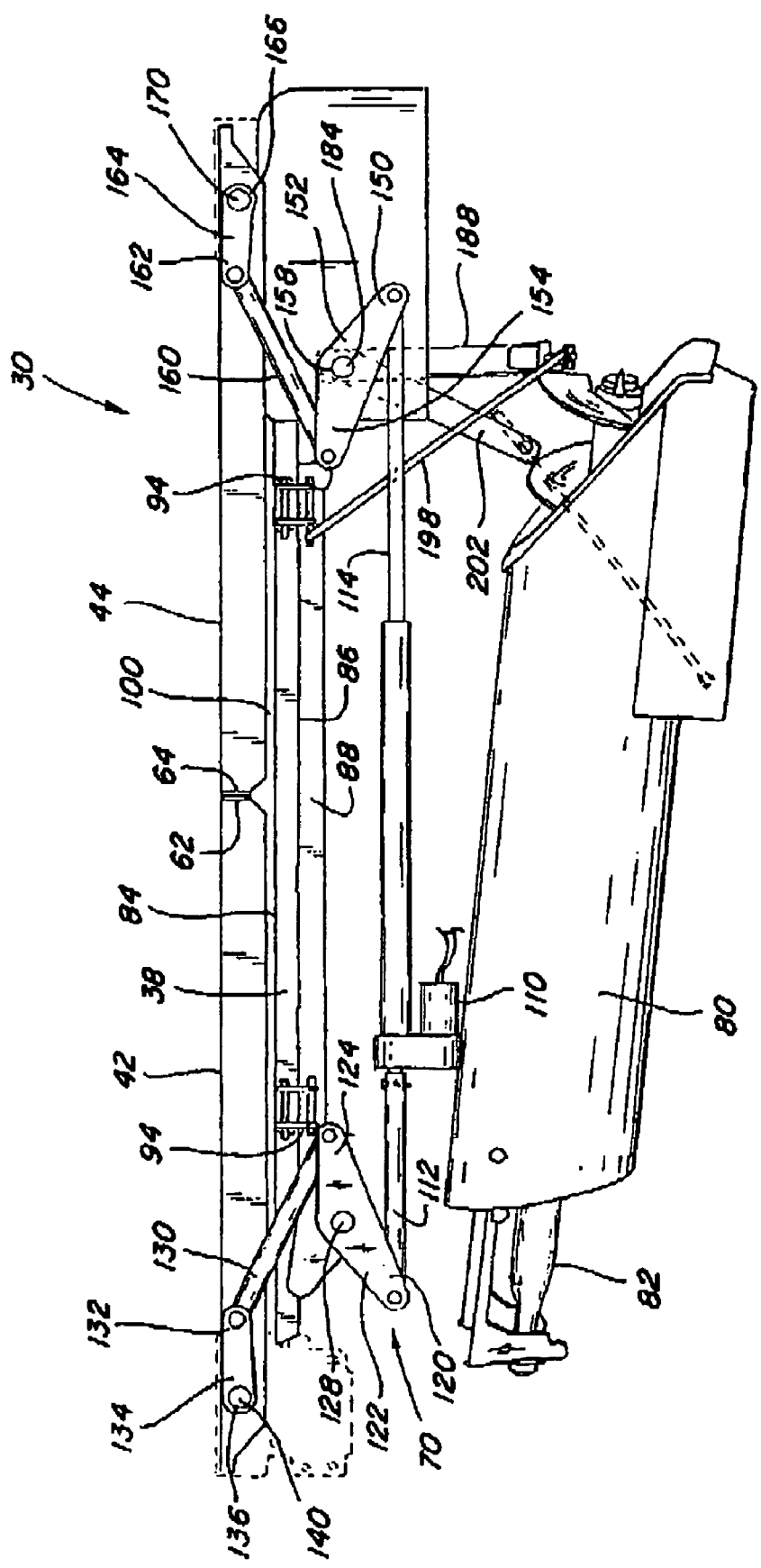
FIG. 4 is a simplified fragmentary rear view of the foldable extension of FIG. 1, with the corner pieces and the grain tank deleted for purposes of clarity and to better illustrate the linkage system for the foldable extension.
Figure 5:
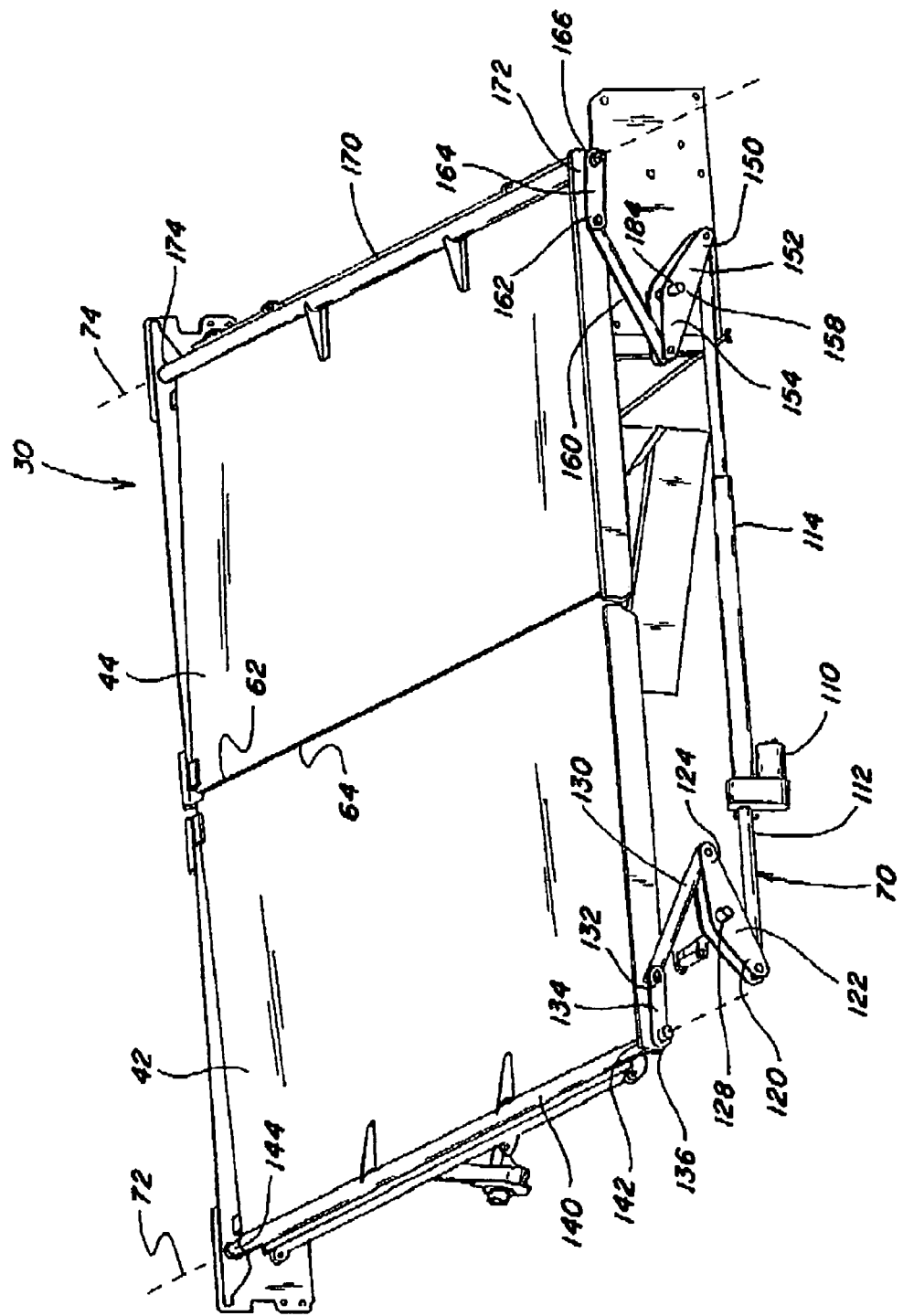
FIG. 5 is a simplified perspective view of the components of FIG. 4.

With reference most particularly to FIGS. 1 and 2, foldable extension 30 includes a forward or front extension panel 32 preferably of substantially rigid material such as sheet metal, plastic, or another suitable material for the present application. Panel 32 has a generally horizontal lower edge portion positioned generally along that portion of upper edge 24 extending along forward wall 14, defined as the forward wall edge, and is connected to the grain tank 12, such as by a pivot assembly or joint 34, to be rotatable about an axis of rotation generally along or adjacent to such forward wall edge. Pivot assembly or joint 34 can take many suitable forms, including a rotatable shaft or tube operatively associated with or connected to the panel 32, or any suitable hinge or hinge-type device, such as a plastic living hinge, a piano hinge, multiple hinges, or other suitable hinging or pivoting elements, operable to enable pivotal movement of panel 32 between a deployed position (FIGS. 1, 2, and 3) in which such panel 32 is oriented at an obtuse, interior angle to horizontal, denoted by angle A in FIG. 1, and a folded position as generally shown in FIGS. 4 and 5, discussed hereinafter.

Foldable extension 30 also includes a rear extension panel 38 located opposite forward panel 32, which rear panel 38 is preferably likewise constructed of a substantially rigid material such as a metal or plastic, and having a lower edge portion positioned generally along that portion of upper edge 24 extending along rear wall 16, defined as the rear wall edge, and is connected to the grain tank 12, such as by a pivot assembly or joint 40, to be rotatable about an axis of rotation generally along or adjacent to such rear wall edge. As with pivot assembly or joint 34, pivot assembly or joint 40 can take many suitable forms operable to enable pivotal movement of panel 38 between a deployed position (FIGS. 1, 2, and 3) in which such panel 38 is oriented at an obtuse, interior angle to horizontal, similar to, but not necessarily the same as, that denoted by angle A in FIG. 1, and a folded position as generally shown in FIGS. 4 and 5, discussed hereinafter.

With reference now, also, to FIG. 3, left and right extension panels 42 and 44, which are also preferably constructed of a substantially rigid sheet metal or plastic material, are located between front and rear extension panels 32 and 38 along opposite sides of grain tank 12, above side walls 18 and 20, respectively, and have lower edge portions positioned generally along those portions of upper edge 24 extending along left and right walls 18 and 20, defined as left and right wall edges, respectively, and are connected to the grain tank 12, such as by a pivot assemblies or joints 46 and 48 (FIG. 2), to be rotatable about respective axes of rotation generally along or adjacent to such left and right wall edges. As with pivot assemblies or joints 34 and 40, pivot assemblies or joints 46 and 48 can take many suitable forms operable to enable pivotal movement of panel 38 between a deployed position (FIGS. 1, 2, and 3) in which such panels 42 and 44 are oriented at obtuse, interior angles to horizontal, similar to, but not necessarily the same as, that denoted by angle A in FIG. 1, and a folded position as generally shown in FIGS. 4 and 5, discussed hereinafter.

For purposes of further discussion herein, references to inner edges or inner portions or the like of extension panels are intended to refer to those edges or portions of the panels that are closer to the top of the grain tank 12 when extension 30 is unfolded and references to outer edges or outer portions or the like of extension panels are intended to refer to those edges or portions of the panels that are farther from the top of the grain tank 12 when extension 30 is unfolded. In general, each of the extension panels 32, 38, 42, and 44, are operably pivotally connected along, near, or at their inner edges or sides to the grain tank 12, generally along, at, or near upper edges thereof.

Similarly, references to inner surfaces of extension panels are intended to refer to those surfaces that are closer to the top of the grain tank 12, and facing generally inwardly towards the grain tank 12, when extension 30 is folded and references to outer surfaces of extension panels are intended to refer to those surfaces that are farther from the top of the grain tank 12, and facing generally outwardly from the grain tank 12, when extension 30 is folded.

Foldable extension 30 further includes a plurality of pliable corner pieces or panels 50 (FIG. 3) that extend between and enclose, respectively, corner gaps located between the adjacent panels 32, 38, 42, and 44. As shown in FIG. 3, representative corner panels 50 extend between panel 32 and panels 42 and 44. Similar corner panels would be employed to close the corner gaps between the adjacent panels 38, 42, and 44. As will be appreciated from U.S. Pat. No. 6,679,772, which is incorporated herein by reference thereto, the configurations of the lateral side portions of the panels 32, 38, 42, and 44 and of the corner panels 50 and their points of connection to such panels 32, 38, 42, and 44 may vary from the particular configuration depicted in FIG. 3, and such corner panels may take various forms and be constructed of various materials and include various features to facilitate the folding and unfolding of the extension 30. The corner panels 50 of FIG. 3 are connected to panels 32, 38, 42, and 44 at locations generally along or near the lateral side portions thereof at locations such that, as extension 30 is unfolded, corner panels 50 stretch or fan or expand to extend between extension panels 32, 38, 42, and 44 to effectively seal the corner gaps between such panels when extension 30 is unfolded into its unfolded or deployed position and such that, as extension 30 is folded, corner panels 50 compress or fold or contract to permit an ordered folding of the extension panels into a stacked arrangement, as will be further discussed hereinafter.

As has been previously noted, FIG. 4 depicts the extension 30 in its folded position, when viewed from the rear, with the extension panels 32, 38, 42, and 48 disposed in a stacked, overlaying arrangement. For purposes of clarity, including in the depiction and discussion of the operation of the linkage system for the extension 30, the corner pieces 50 and the grain tank 12 are not shown in such figure and in many of the other drawing figures herewith. FIG. 5 is a perspective view of the components of FIG. 4 and FIG. 6 is a top view of such components, similar in many respects to FIGS. 4 and 5, but with the left extension panel 42 unfolded, thereby better showing the stacked, overlaying arrangement of the extension panels when extension 30 is folded.

Figure 6:
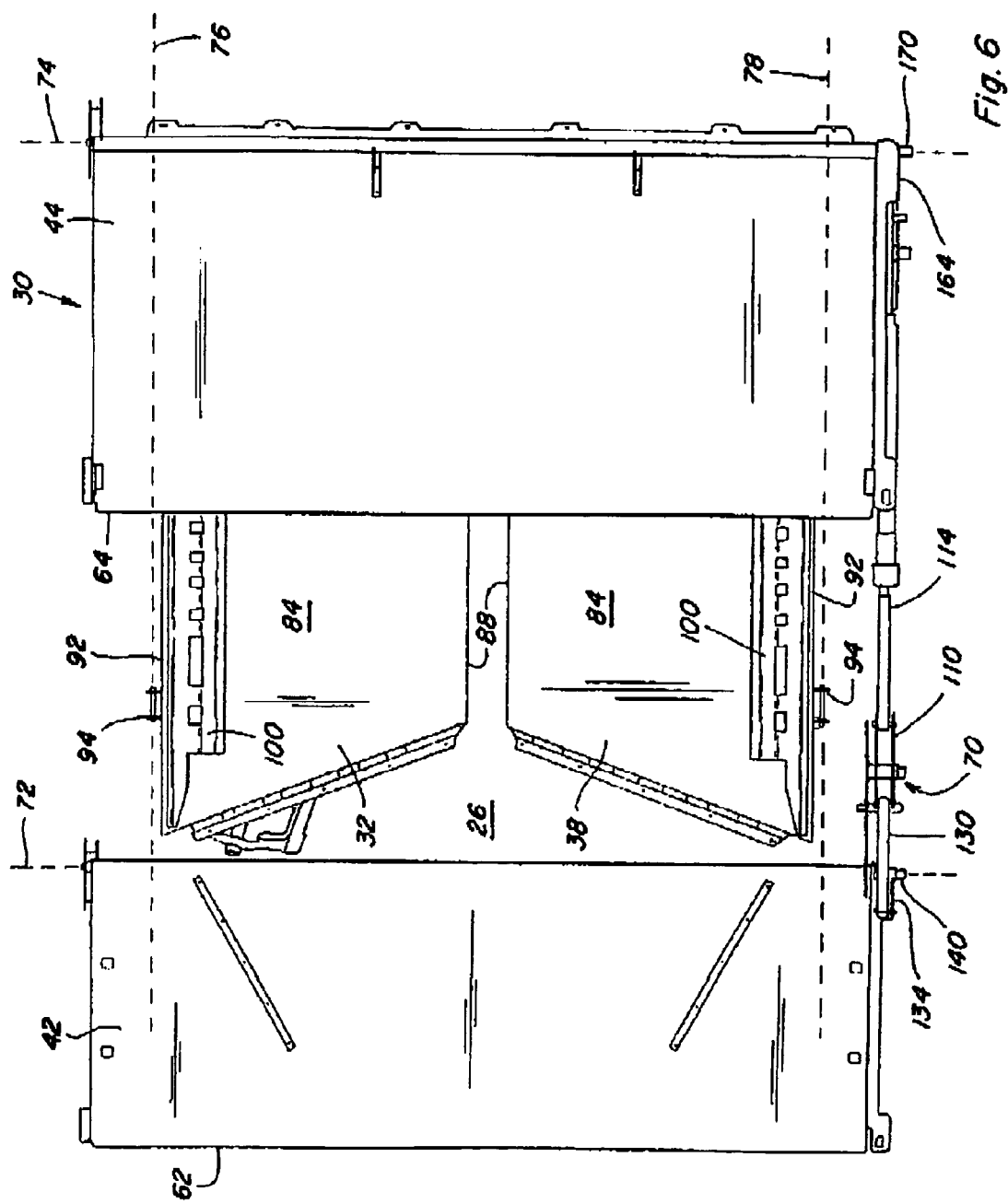
FIG. 6 is a simplified top view of the components of FIG. 4, similar to FIG. 5, but with the left side extension panel unfolded to better show the stacked overlay arrangement of the extension panels when the foldable extension is in its folded position.
Figure 7:
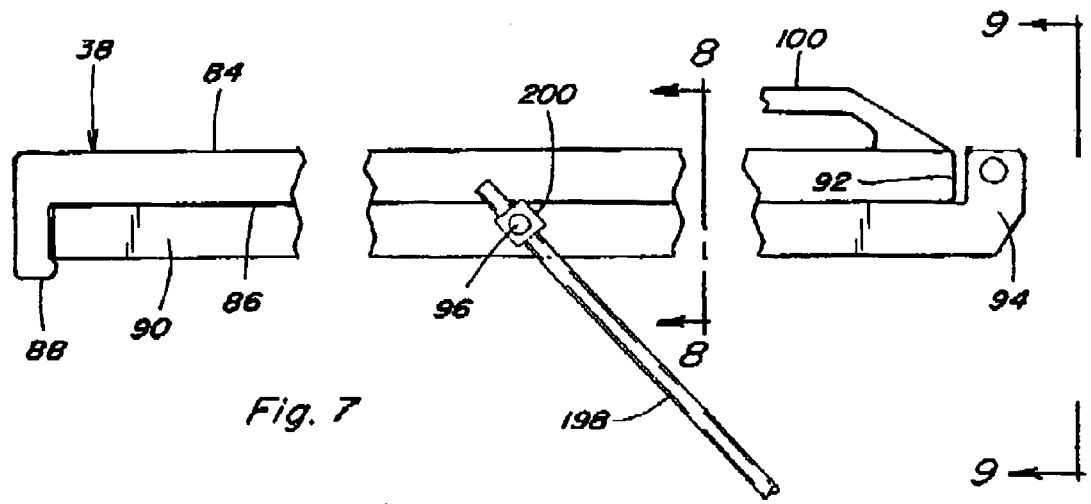
FIG. 7 is a fragmentary side view of a representative front extension panel.
Figure 8:
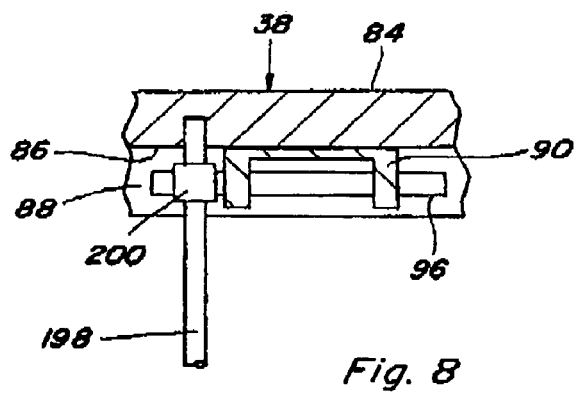
FIG. 8 is a simplified fragmentary sectional view taken along cut 8-8 of FIG. 7.
Figure 9:
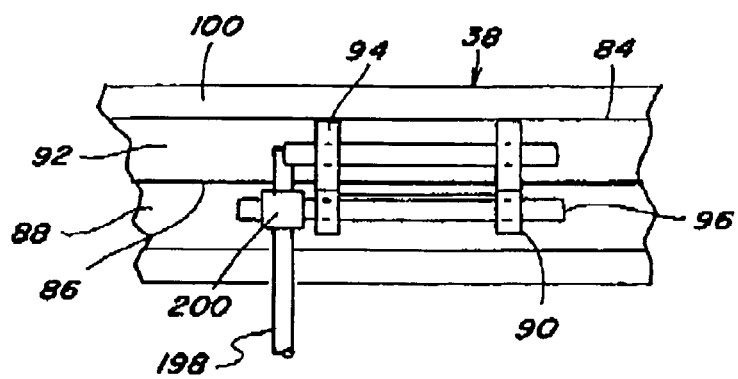
FIG. 9 is a simplified fragmentary end view taken along cut 9-9 of FIG. 7.

In FIGS. 4-6, the front and rear extension panels 32 and 38 are shown in their folded positions, lying generally in the same horizontal plane, extending across the upwardly facing opening 26 of grain tank 12 to each partially overlay such opening 26. When the extension 30 is folded, as shown in FIGS. 4 and 5, left and right extension panels 42 and 44 are disposed to be at least generally horizontal and to at least roughly define a horizontal plane, generally parallel to the plane in which front and rear extension panels 32 and 38 are disposed, and to overlay, in a crossways stacking arrangement, front and rear extension panels 32 and 38. Left and right extension panels 42 and 44 are so sized and dimensioned that, when extension 30 is folded, the top ends 62 and 64 of panels 42 and 44 closely adjoin one another so that such panels 42 and 44 form a cover over the top of the upwardly facing opening 26 of the grain tank 12.

It should be appreciated and understood, however, that, in some embodiments, the left and right extension panels 42 and 44 may be designed to lie in planes that are slightly canted relative to one another, such as is shown in FIG. 5, rather than in the same plane, in order to permit or provide a shingling effect, with an outer portion of the left extension member 42 slightly overlapping the outer portion of the right extension member 44. Depending upon constructional details or desires of manufacturers or users, the outer portions of such left and right extension panels 42 and 44 could therefore be configured to have complementarily reduced thicknesses to accommodate such shingling and a suitable engagement between such extension panels 42 and 44 when the extension 30 is folded and to ensure better mating therebetween and a better covering of the upwardly facing opening 26 of the grain tank 12. For purposes of further discussion herein, even though the left and right extension panels 42 and 44 may thus lie in planes slightly canted to one another when the extension 30 is closed, such extension panels should still be considered to lie in generally the same plane.

A preferred linkage system for controlling the folding and unfolding of extension 30 and the individual extension panels 32, 38, 42, and 44, and the operation thereof, is illustrated in FIGS. 4-13. In general, linkage system 70 is operable within the desired geometry to provide proper weight and balance to the extension 30 and to effect the unfolding and folding of extension 30 in an ordered manner. In such regard, linkage system 70 is generally operable to unfold extension 30 from its folded position, as depicted in FIGS. 4 and 5, by, initially, pivotally rotating left extension panel 42 about a generally horizontal axis of rotation 72 (FIGS. 5 and 6) along or near the top of the grain tank 12, typically through an angle greater than 90°, and often of approximately 140°, to a stop position, with the rotation of the left panel 42 about the axis of rotation 72 typically being limited by both the linkage and a positive stop at or near the front of the grain tank 12. The right extension panel 44 and the front and rear extension panels 32 and 38 are similarly caused to pivotally rotate about respective axes of rotation 74, 76, and 78 (FIG. 6) along or near the top of the grain tank 12, also typically through an angle greater than 90°, and often of approximately 140°, to their unfolded positions. As such unfolding occurs, once the front and rear extension panels 32 and 38 have unfolded sufficiently, bubbler auger 80 (FIG. 4) within the grain tank 12 is inclined to elevate the distal end 82 of such bubbler auger 80 within the grain tank 12 for the improved movement of grain within such grain tank 12.

Folding of the extension 30 under control of the linkage system 70 is effected by a reversal of such operations.

In the preferred embodiment depicted in FIGS. 4-13 the front and rear extension panels 32 and 38 are configured to generally be mirror image constructions of one another, each of which has an outer surface 84, an inner surface 86, and a lip portion 88 at its outer edge. As is shown in somewhat more detail in FIGS. 3 and 7-9, front and rear extension panels 32 and 38 preferably include U-shaped brackets 90 extending along the inner surfaces 86 thereof from the lip portions 88 of such extension panels 32 and 38 to, and slightly beyond, the inner sides 92, with projecting portions 94 at the inner sides 92 forming part of the pivot assemblies 34 and 40 (FIG. 1) for mating such extension panels 32 with the grain tank 12. Such brackets 90 help strengthen the extension panels 32 and 38. Associated with one of such brackets 90 of each of the front and rear extension panels 32 and 38 are pin members 96 that extend laterally across the bracket 90 at an intermediate location, the purpose of which will be further addressed hereinafter. A kick shield 100 is preferably provided on the outer surface 84 of each of the front and rear extension panels 32 along the inner side 92 thereof to provide a resilient spacer upon which the left and right extension panels 42 and 44 may rest when extension 30 is folded, as in FIG. 4, and to act as a cushioning member when the extension 30 is unfolded and such kick shield is moved to come into contact with upper edges or portions of the grain tank 12. For purposes of clarity and simplicity of drawing, in many of the drawings hereof kick shield 100 is not separately depicted but is considered to be part of upper surface 84 of front and rear extension panels 32 and 38.

The preferred linkage system depicted in the drawings includes a control actuator, such as linear actuator 110, that is mounted behind the rear of the grain tank 12, outside the grain tank 12, to control the folding and unfolding operations. In the depicted embodiment, such linear actuator 110 is or may include a hydraulic cylinder or an electrically powered linear actuator, and is so located, along with its associated wiring and connections, external to the grain tank 12 in order to make such construction readily accessible for easy servicing thereof even when the grain tank 12 is filled. It should be appreciated, however, that many alternative forms of control actuators could be equally as well employed to achieve desired results, and that a linear actuator of the type herein described is but one of many possible embodiments that would be acceptable.

In the depicted linkage system 70 such linear actuator 110 includes, or has associated therewith, at one end thereof, a first control extension or rod 112, sometimes also referred to as the left control rod, which may preferably be physically adjustable to a desired, fixed length, operable to control the various linkage system components or linkages associated with left external panel 42, as well as, at the other end thereof, a second control extension or rod 114 sometimes referred to as the right control rod, operable to control the various linkage system components or linkages associated with the right, front, and rear extension panels 44, 32, and 38 as well as the various linkage system components or linkages for positioning the bubbler auger 80 within the grain tank 12.

Left control rod 112 is operatively connected to the drive side 120 of a centrally mounted pivot member 122 that has an opposite throw side 124 operatively connected to left throw rod 130. Pivot member 122 is operably mounted for rotation about its central mounting location 128. Throw side 124 of pivot member 122 is operatively connected through throw rod 130 to free end 132 of a pivot link member 134 which is connected near its opposite end 136 to left torque tube 140 for rotational movement of such pivot link member 134 and left torque tube 140 about axis of rotation 72 (FIGS. 5 and 6). Left torque tube 140 is connected to or forms part of the inner portion of left extension panel 42 and extends between mounting bushings and fixtures 142 and 144 at the opposite sides of left extension panel 42.

Somewhat similarly, right control rod 114 is operatively connected to the drive side 150 of a centrally mounted pivot member 152 that has an opposite throw side 154 operatively connected to right throw rod 160. Pivot member 152 is operably mounted for rotation about its central mounting location 158. Throw side 154 of pivot member 152 is operatively connected through throw rod 160 to free end 162 of a pivot link member 164 which is connected near its opposite end 166 to right torque tube 170 for rotational movement of such pivot link member 164 and left torque tube 170 about axis of rotation 74 (FIGS. 5 and 6). Right torque tube 170 is connected to or forms part of the inner portion of left extension panel 44 and extends between mounting bushings and fixtures 172 and 174 at the opposite sides of right extension panel 44.

Well known pin connections, which may employ pin and locking pieces, such as clevis and cotter pins and the like, as well as any other constructions whose uses would achieve the intended result, can be utilized to operatively connect the various drive and throw rods to the pivot members and pivot link members to permit the proper operation of the linkages, which operations will be further addressed hereinafter. Depending upon the desires of manufacturers or users, pin connections of numerous types and variations could be equally as well employed to achieve the intended results.

Preferably, many of such noted linkage components, like control actuator 110, are mounted external to the grain tank 12 to provide ready access thereto, even when the grain tank 12 is filled, in the event of problems or the need for servicing. In such regard, it would be relatively easy to then disconnect the wiring connections from the linear actuator or to disconnect the control rods from the drive sides 120 and 150 of respective pivot members 122 and 152 to permit the manual opening or closing of the left and right extension panels 42 and 44.

Figure 12:
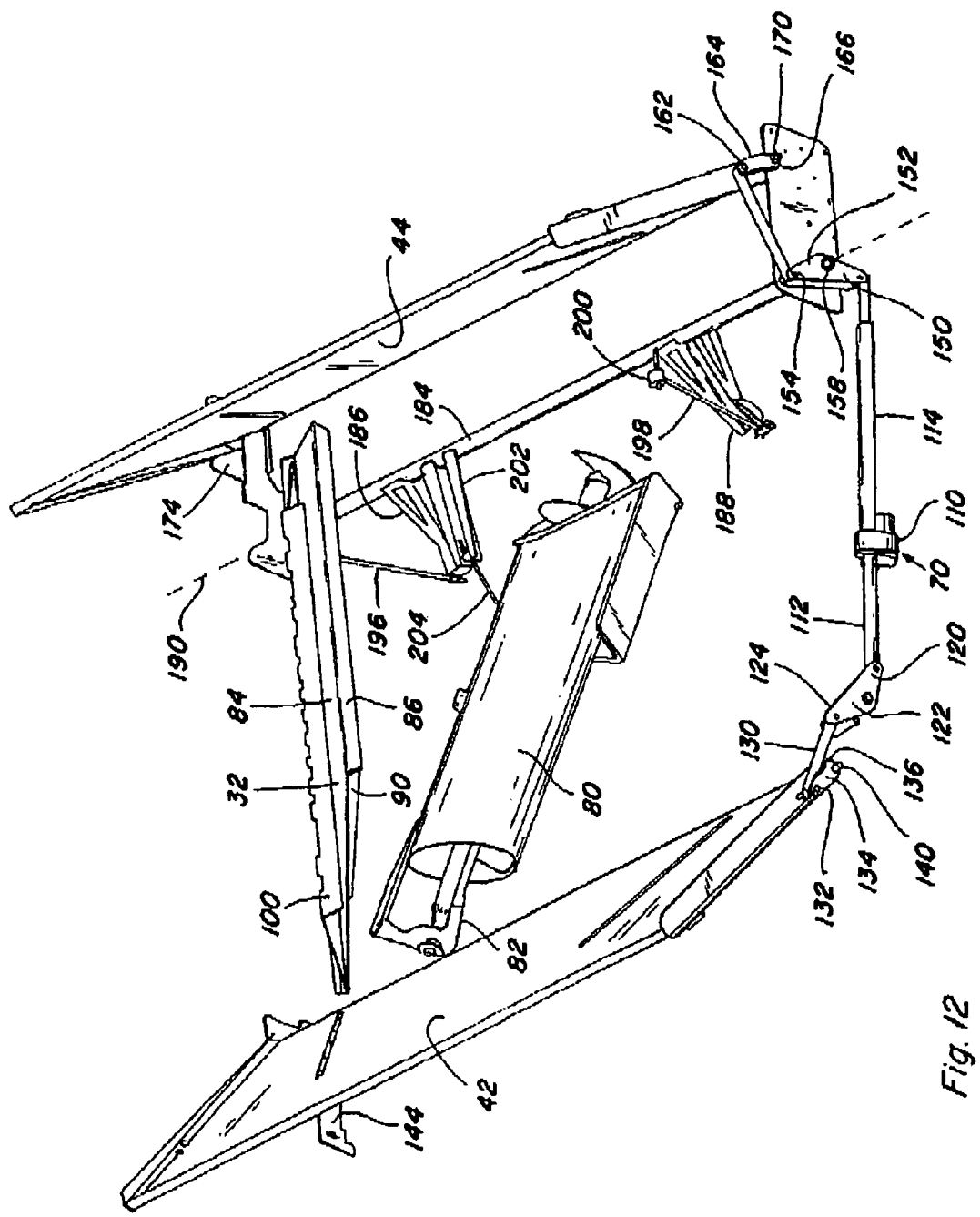
FIG. 12 is a simplified perspective view generally corresponding to FIG. 11, but with the rear extension panel deleted for purposes of clarity.

Pivot member 152, associated with right control rod 114, is further operatively connected at its central mounting location 158 to a front/rear torque tube 184, best shown in FIG. 12, that extends generally through at least a portion of the grain tank 12 from beyond the rear thereof towards the front of the grain tank 12 to a mounting fixture, such as the mounting fixture 174. As best shown in FIGS. 3 and 12, first and second linkage extensions 186 and 188 are fixedly mounted at locations along the extent of front/rear torque tube 184 to extend outwardly therefrom and to be rotatable therewith about axis of rotation 190 (FIG. 12). First ends of throw rods 196 and 198 are operatively connected, respectively, to linkage extensions 186 and 188, and the opposite ends of such throw rods 196 and 198 are operatively connected to respective joinder constructions 200 associated with pins 96 (FIGS. 7-9) through U-brackets 90 of front and rear extension panels 32 and 38.

As has been noted previously, pin connections of various types and configurations can be utilized for effecting operative connections between the various components. Similarly, numerous types and configurations of well known joinder constructions can be readily utilized with the throw rods 196 and 198 and pins 96 to achieve the desired operations and results.

Also associated with front/rear torque tube 184 is a further bubbler linkage extension 202 (FIG. 12) fixedly mounted along the extent of such torque tube 184 to extend outwardly therefrom and to be rotatable therewith about axis of rotation 190. Bubbler lift rod or cable 204 operatively joins bubbler linkage extension 202 to bubbler auger 80, such as in a slide and catch arrangement, which arrangement allows some rotation of the front/rear torque tube 184 and bubbler linkage extension 202 without any consequent movement of the bubbler auger 80, followed by a lifting of the bubbler auger 80 to an inclined position after sufficient rotation has been achieved that lift rod or cable 204 is in a catch position relative to the bubbler linkage extension 202 and bubbler auger 80.

Figure 10:
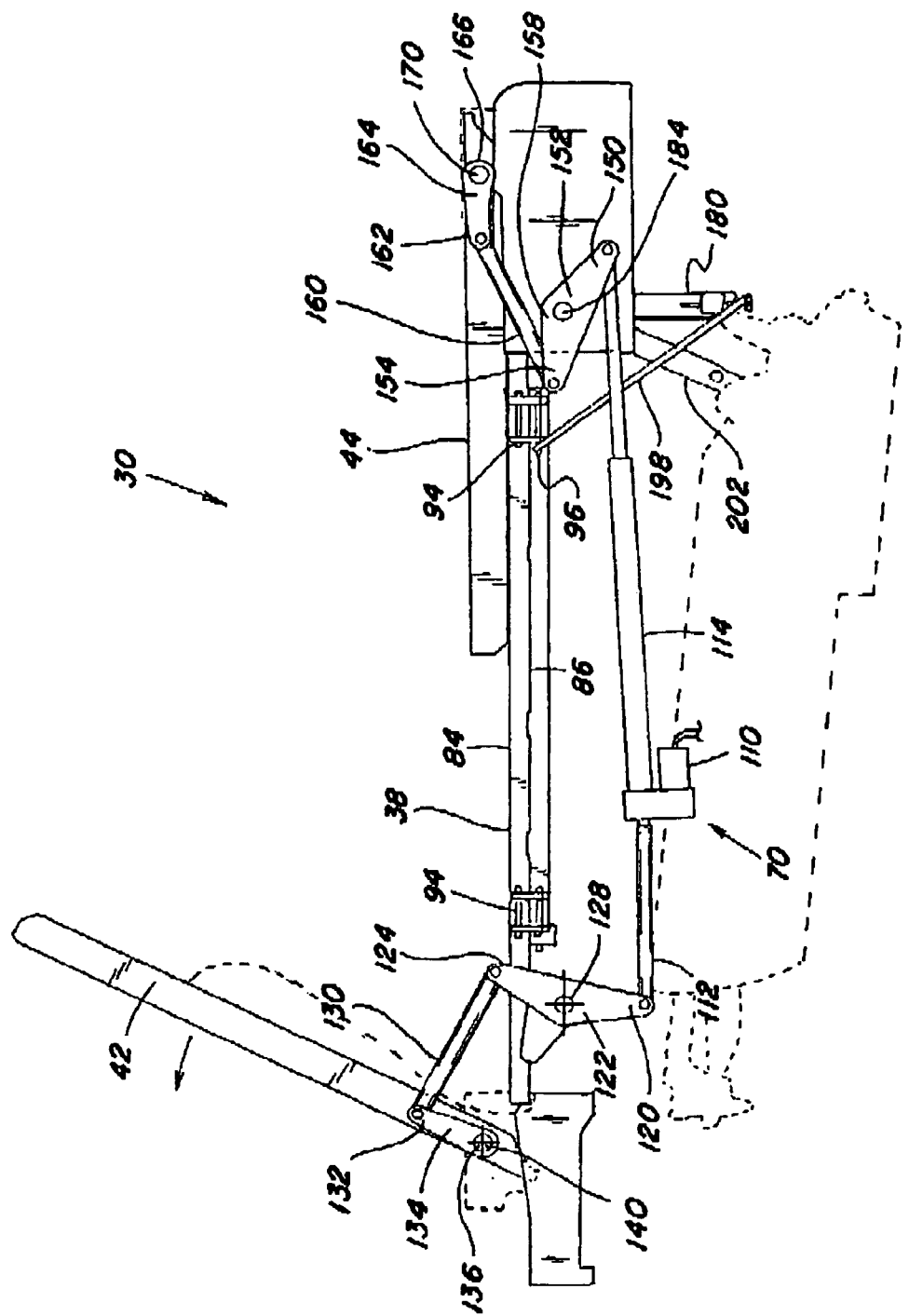
FIG. 10 is a simplified fragmentary rear view of the components of FIG. 4, illustrating the partial unfolding of the left extension panel, with the bubbler auger shown in outline.
Figure 13:
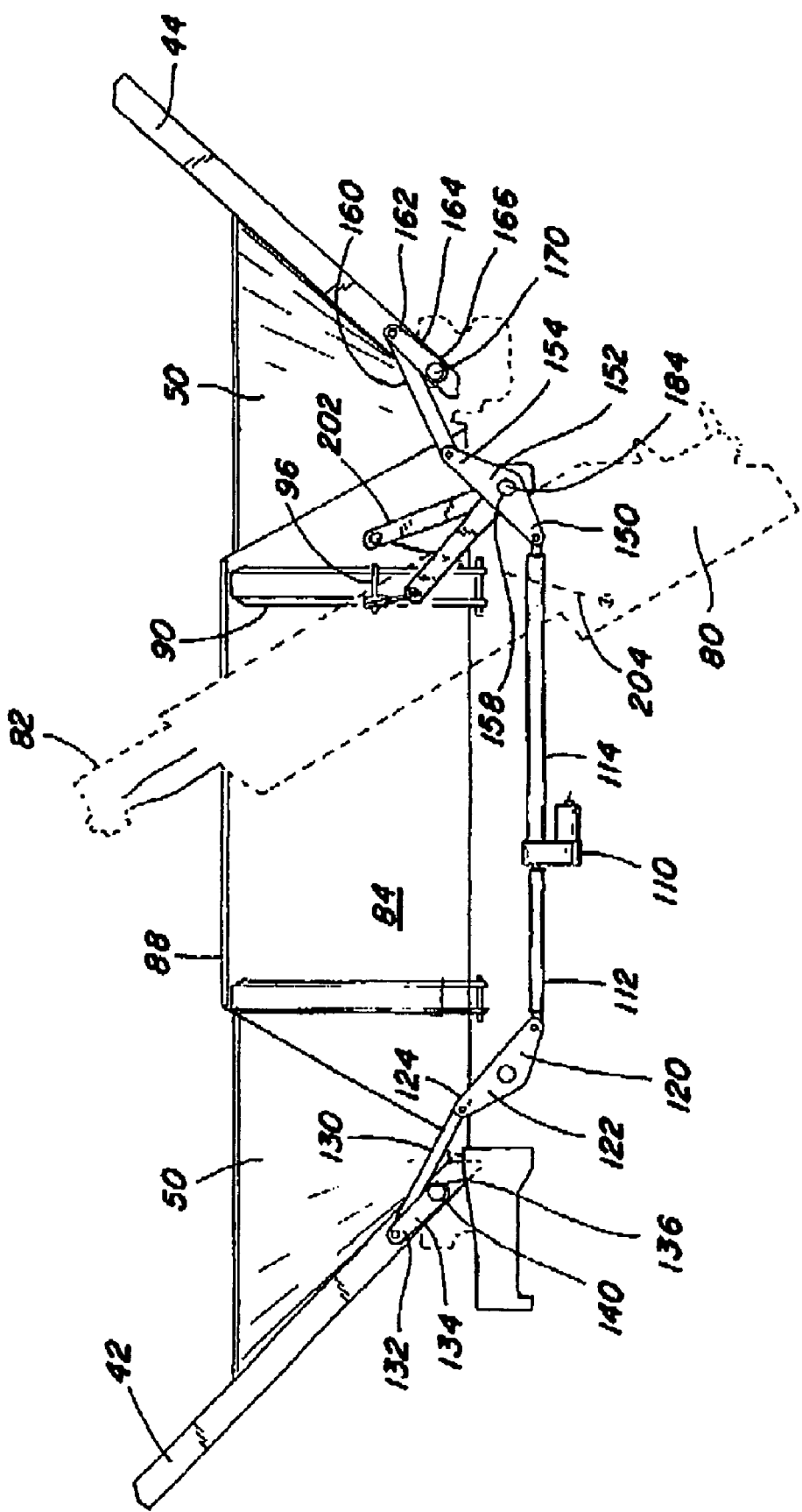
FIG. 13 is another simplified rear view, illustrating the extension 30 unfolded, with the rear extension panel deleted for purposes of clarity and with the bubbler auger shown in outline.

The ordered unfolding of extension 30 is best understood by initial reference to FIGS. 4-5, which depict the extension 30 in its folded position, through, in sequence, FIGS. 10, 6, and 11-12, which depict the extension 30 at various points in its unfolding operation, to FIGS. 2, 3 and 13, which depict extension 30 in its unfolded position. As has previously been noted, such unfolding occurs in sequence using the linkages of the linkage system 70 operating within their desired geometries to provide proper weight and balance of the overall construction. When linear actuator 110 is actuated, such actuation causes control rods 112 and 114 to both seek to retract. However, the force required to begin opening or unfolding left extension panel 42 is less than the force required to begin the simultaneous opening of the right, front, and rear extension panels 44, 32, and 38. Consequently, as linear actuator 110 operates, as shown in FIG. 10, retraction of right control rod 114 causes left control rod 112 to be moved to effect a rotation of pivot member 122 about its central pivot point 128 to move throw rod 130 and pivot link member 134 to cause left torque tube 140 and left extension panel 42 to be rotated towards the unfolded position of such left extension panel 42 until left extension panel 42 reaches its stop position, as shown in FIG. 6.

Figure 11:
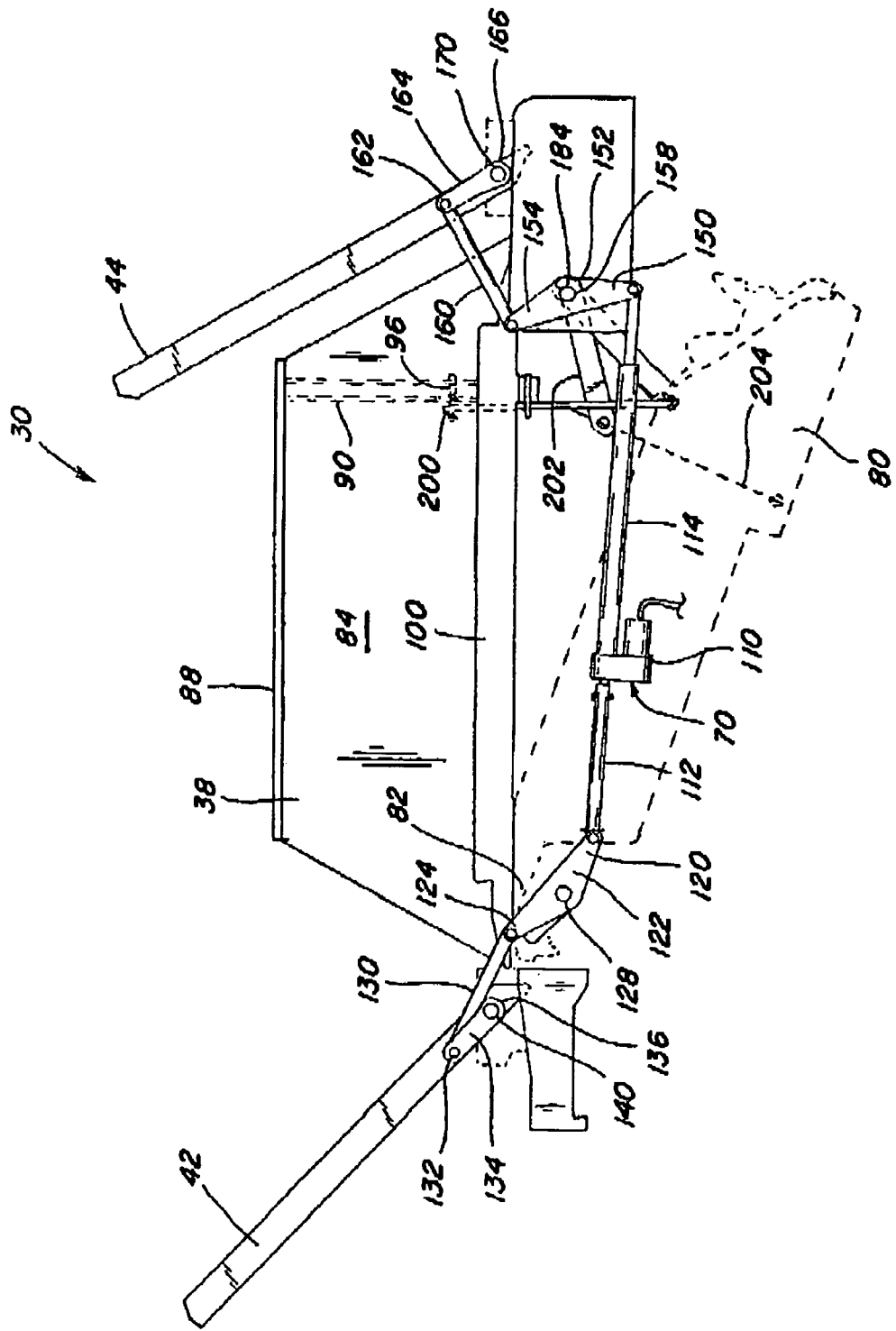
FIG. 11 is another simplified fragmentary rear view of the components of FIG. 4, showing the right, front, and rear extension panels partially unfolded after the left extension panel has been unfolded.

Thereafter, as control rod 114 continues to retract, the movement of control rod 114 effects a rotation of pivot member 152 about its central pivot point 158 to move throw rod 160 and pivot link member 164 to cause right torque tube 170 and right extension panel 44 to be rotated towards the unfolded position of such right extension panel 42. As this is occurring, the rotation of pivot member 152 also effects rotation of front/rear torque tube 184 (FIG. 12) and the rotation of the linkage extensions 186 and 188 and bubbler linkage extension 202. Such rotation of linkage extensions 186 and 188 effects movement of throw rods 196 and 198 to act against front and rear extension panels 32 and 38 to cause them to begin to simultaneously begin to unfold. As such actions are occurring, the rotation of bubbler linkage extension 202 causes bubbler lift rod or cable 204 to move to its catch position and to effect the subsequent lifting of the bubbler auger towards an inclined position. FIGS. 11 and 12 depict the extension 30 in a partially unfolded position, with left extension panel 42 in its unfolded position, with right, front, and rear extension panels 44, 32, and 38 partially unfolded, and with bubbler auger 44 partially elevated.

The linkage system 70 is preferably designed and so balanced that the right, front, and rear extension panels 44, 32, and 38 all complete their respective movements to unfolded positions at about the same time and that elevation of the bubbler auger 80 is likewise completed at about the same time. FIGS. 2, 3, and 13 depict extension 30 in its unfolded position.

In general, extension 30 is designed and configured such that, when extension 30 is in its unfolded position, the weight of the bubbler auger counterbalances the weight of the right, front and rear extension panels 44, 32, and 38 so that such right, front, and rear extension panels 44, 32, and 38 will be more immediately lowered than the left extension panel 42 upon an actuation of the linear actuator 110 to fold extension 30. Upon such an actuation of linear actuator 110, as control rod 114 extends, control rods 112 and 114 thus move in the opposite order from the movement of such control rods during unfolding, resulting in an initial lowering of the bubbler auger 80 towards its nominal or stored position and the folding of the front, rear, and right extension panels 32, 38, and 44, with such lowering of the bubbler auger 80 to its nominal or stored position typically being completed first, followed by the completed folding of the front and rear extension panels 32 and 38 at about the same time and the slightly later completion of the folding of the right extension panel 44. When folding of the right extension panel 44 has been completed, sufficient force is then available to effect the necessary movement of control rod 112 to effect the folding of the left extension panel 42.

Because of such sequential, ordered unfolding and folding of extension 30, the maximum force capacity of the linear actuator can be reduced from the capacity that would be otherwise required if all the extension panels were to be unfolded or folded simultaneously. With the system described hereinabove, the maximum load on the linear actuator 110 occurs when the unfolding operation is initiated and the linkage system 70 is attempting to lift the extension panels from their generally horizontal positions over the upwardly facing opening 26 of the grain tank 12.

Figure 14:
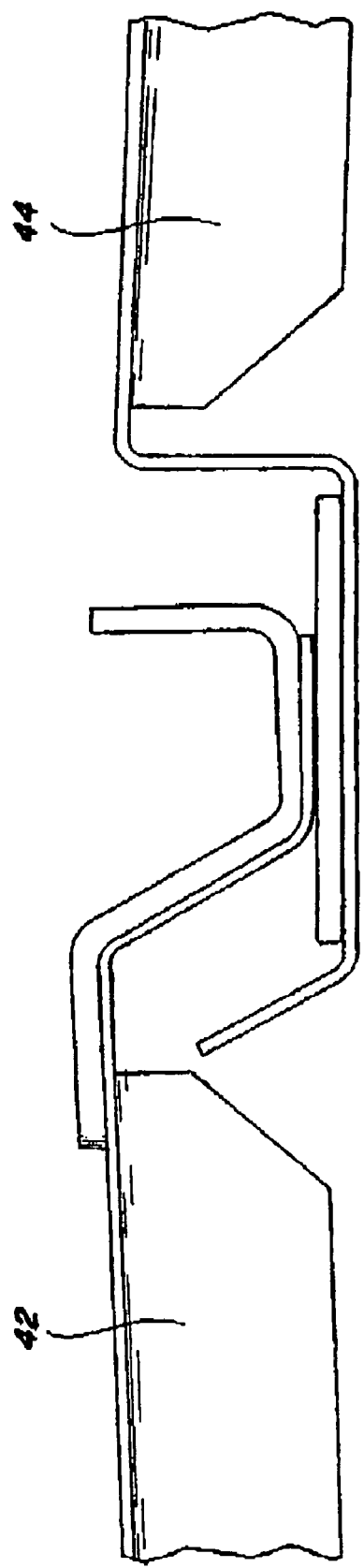
FIG. 14 is a fragmentary side view of an embodiment of left and right extension panels engaged with one another, when in their folded positions, in a shingling relationship.

As has been previously noted hereinabove, the left and right extension panels may be configured to partially overlap one another and to matably engage with one another as they are moved to their folded positions. FIG. 14 depicts an overlapping or shingling configuration that may be advantageously utilized, if so desired.

Although not required, flexible gaskets could, if desired, be employed at points of engagement of the extension panels to better seal the folded extension 30 against the penetration of rain or foreign materials at the points of engagement.

In light of all the foregoing, it should thus be apparent to those skilled in the art that there has been shown and described an automatedly unfoldable and foldable extension and cover a grain tank of an agricultural harvesting machine, which construction realizes the advantages sought therefor.

However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. An automatedly unfoldable and foldable extension for increasing the grain holding capacity of a grain tank of an agricultural harvesting machine, the grain tank including angularly related upper peripheral portions defining an upwardly facing opening, said automatedly unfoldable and foldable extension comprising:

a plurality of extension panels mounted for pivotal movement about corresponding, respective, upper peripheral portions of the grain tank, wherein the plurality of extension panels includes at least first and second extension panels, each of said extension panels being pivotally movable between a folded position for such extension panel, in which folded position such extension panel is positioned generally horizontal and extending over a portion of the upwardly facing opening of the grain tank, through an angle exceeding 90 degrees relative to horizontal, and a deployed position, in which deployed position such extension panel extends upwardly and outwardly relative to the upwardly facing opening of the grain tank, the extension panels that are laterally adjacent to one another when in their deployed positions forming an extension panel pair with a corner gap between the adjacent sides of said extension panels of said extension panel pair, corner pieces connected extending between said extension panels of said extension panel pairs to close said corner gaps, said extension panels and said corner pieces forming a grain tank extension capable of holding a quantity of grain extending above the upwardly facing opening of the grain tank when said extension panels are in their deployed positions, a linkage system actuatable to control the pivotal movement of said extension panels between their folded positions and their deployed positions, said linkage system including a control actuator and a plurality of linkages operatively connected between said control actuator and said extension panels for pivotally moving said extension panels about the corresponding, respective upper peripheral portions of the grain tank, at least said control actuator and certain of said plurality of linkages being mounted external to the grain tank to be readily accessible for servicing and forming an external linkage set, said control actuator operable, in one mode, to effect the automated unfolding of said extension panels from their folded positions and their movement to their deployed positions and, in another mode, to effect the automated folding of said extension panels from their deployed positions and their movement to their folded positions, wherein said control actuator is operatively connected to first and second control extensions, said first control extension operable to effect the folding and unfolding of at least the first extension panel, said second control extension operable to effect the folding and unfolding of at least the second extension panel, wherein said linkage system includes a first torque tube associated with said first extension panel and operatively connected to said first control extension to be rotatable to pivotally move said first extension panel between its folded and deployed positions.

2. The automatedly unfoldable and foldable extension of claim 1 wherein said extension panels, when in their folded positions, cover essentially the entirety of the upwardly facing opening of the grain tank to generally prevent the introduction of rain and foreign materials into the grain tank.

3. The automatedly unfoldable and foldable extension of claim 2 wherein the upwardly facing opening of the grain tank has at least four sides defined as the front, rear, right, and left sides, said plurality of extension panels further includes at least third and fourth extension panels, wherein the first, second, third and fourth extension panels are mounted at the front, rear, right, and left sides of the upwardly facing opening of the grain tank, such mounted extension panels being defined, respectively, as the front, rear, right, and left extension panels, said front and rear extension panels, when disposed in their folded positions, lying in the same general plane above the upwardly facing opening of the grain tank, said right and left extension panels, when disposed in their folded positions, overlaying said front and rear extension panels in a stacked arrangement, said right and left extension panels sized and dimensioned to extend, when in their folded positions, towards one another across the upwardly facing opening of the grain tank to closely adjoin one another.

4. The automatedly unfoldable and foldable extension of claim 3 wherein said right and left extension panels each include outer edge portions, said outer edge portions configured to be complementarily matably engagable with one another when said right and left extension panels are in their folded positions.

5. The automatedly unfoldable and foldable extension of claim 3 wherein said right and left extension panels each include outer edge portions and one of said edge portions overlaps the other outer edge portion when said right and left extension panels are in their folded positions.

6. The automatedly unfoldable and foldable extension of claim 3 wherein said right and left extension panels lie in the same general plane when in their folded positions.

7. The automatedly unfoldable and foldable extension of claim 6 wherein said right and left extension panels, when in their folded positions, lie in planes slightly canted to one another but generally defining a horizontal plane.

8. The automatedly unfoldable and foldable extension of claim 6 wherein the general plane in which said right and left extension panels are disposed when in their folded positions is generally parallel to the general plane in which said front and rear extension panels are disposed when in their folded positions.

9. The automatedly unfoldable and foldable extension of claim 1 wherein said first and second extension panels are so sized and dimensioned that, when folded to their folded positions, they extend over to essentially entirely cover the upwardly facing opening of the grain tank and closely adjoin one another to form a cover over such upwardly facing opening.

10. The automatedly unfoldable and foldable extension of claim 9 wherein said first and second extension panels are foldable to complementarily engage one another to form said cover.

11. The automatedly unfoldable and foldable extension of claim 10 wherein said first and second extension panels, when in complementary engagement with one another, have associated therewith conformable seals at the points of engagement.

12. The automatedly unfoldable and foldable extension of claim 1 wherein said first and second control extensions are located outside the grain tank and are disconnectable from the control actuator even while the grain tank is filled to facilitate servicing of said linkage system.

13. The automatedly unfoldable and foldable extension of claim 1 wherein said second control extension is also operable to effect the folding and unfolding of at least one of a third and fourth extension panel.

14. The automatedly unfoldable and foldable extension of claim 13 wherein the harvesting machine has a bubbler auger disposed within the grain tank and said second control extension is also operable to effect the repositioning of the bubbler auger to elevate one end thereof and position such bubbler auger at an inclination to horizontal when said extension is in its deployed position and to return such bubbler auger it a nominal position when said extension is in its folded position.

15. The automatedly unfoldable and foldable extension of claim 14 wherein, upon actuation of said control actuator to effect unfolding of said extension from its folded position, said first and second control extensions operate in an ordered unfolding sequence to unfold said extension panels and to position the bubbler auger.

16. The automatedly unfoldable and foldable extension of claim 14 wherein, upon actuation of said control actuator to folding of said extension panel from its deployed position, said first and second control extensions operate in reverse of said ordered unfolding sequence to position the bubbler auger and to fold said extension panels.

17. The automatedly unfoldable and foldable extension of claim 1 wherein said linkage system includes a second torque tube associated with said second extension panel and operatively connected to said second control extension to be rotatable to pivotally move said second extension panel between its folded and deployed positions.

18. The automatedly unfoldable and foldable extension of claim 17 wherein at least said control actuator, said first and second control extensions, and said first and second torque tubes are included within said external linkage set.

19. The automatedly unfoldable and foldable extension of claim 17 wherein said linkage system further includes a third torque tube associated with at least one of a third and fourth extension panel and operatively connected to said second control extension to be rotatable to pivotally move at least one of the third and fourth extension panels between their folded and deployed positions.

20. The automatedly unfoldable and foldable extension of claim 19 wherein said linkage system includes bubbler auger linkages associated with the bubbler auger and operatively connected to said second control extension, said bubbler auger linkages operable to effect movement of the bubbler auger between its nominal position and its inclined position as said third torque tube is rotated.

* * * * *